(No Model.) 6 Sheets—Sheet 1.

H. C. & A. E. PEOPLES.
CORN HARVESTER.

No. 482,065. Patented Sept. 6, 1892.

Witnesses
M. E. Fowler
N. J. Collamer

By their Attorneys,
C. A. Snow & Co.

Inventors
Henry C. Peoples and
Alonzo E. Peoples

THE NORRIS PETERS CO., PHOTO-LITHO., WASHINGTON, D. C.

(No Model.) H. C. & A. E. PEOPLES. 6 Sheets—Sheet 2.
CORN HARVESTER.

No. 482,065. Patented Sept. 6, 1892.

Witnesses
M. E. Fowler
N. J. Collamer

Inventors
Henry C. Peoples
Alonzo E. Peoples
By their Attorneys,
C. A. Snow & Co.

(No Model.) 6 Sheets—Sheet 3.
H. C. & A. E. PEOPLES.
CORN HARVESTER.
No. 482,065. Patented Sept. 6, 1892.

Witnesses
M. Fowler
N. Collamer

Inventors
Henry C. Peoples and
Alonzo E. Peoples
By their Attorneys,
C. A. Snow & Co.

(No Model.) H. C. & A. E. PEOPLES. 6 Sheets—Sheet 4.
CORN HARVESTER.

No. 482,065. Patented Sept. 6, 1892.

Witnesses
M. Fowler
A. S. Collamer,

By their Attorneys,
C. A. Snow & Co.

Inventors
Henry C. Peoples and
Alonzo E. Peoples (No Model.) 6 Sheets—Sheet 5.
H. C. & A. E. PEOPLES.
CORN HARVESTER.
No. 482,065. Patented Sept. 6, 1892.
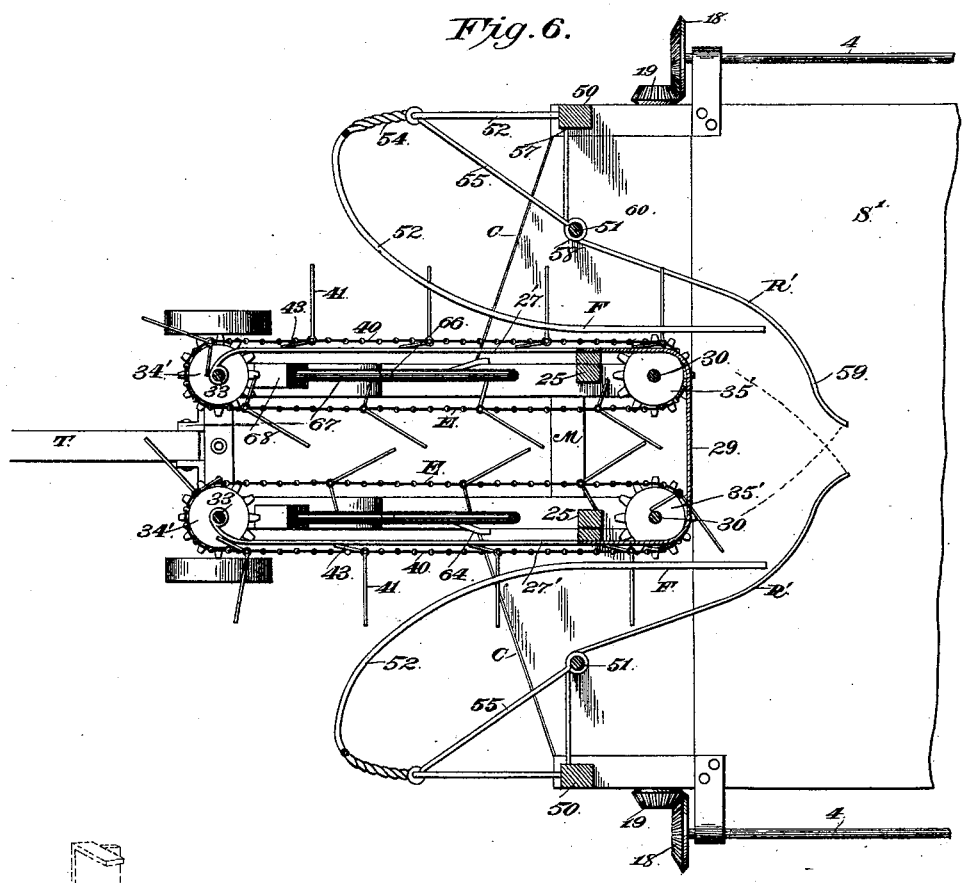

(No Model.) 6 Sheets—Sheet 6.
H. C. & A. E. PEOPLES.
CORN HARVESTER.
No. 482,065. Patented Sept. 6, 1892.
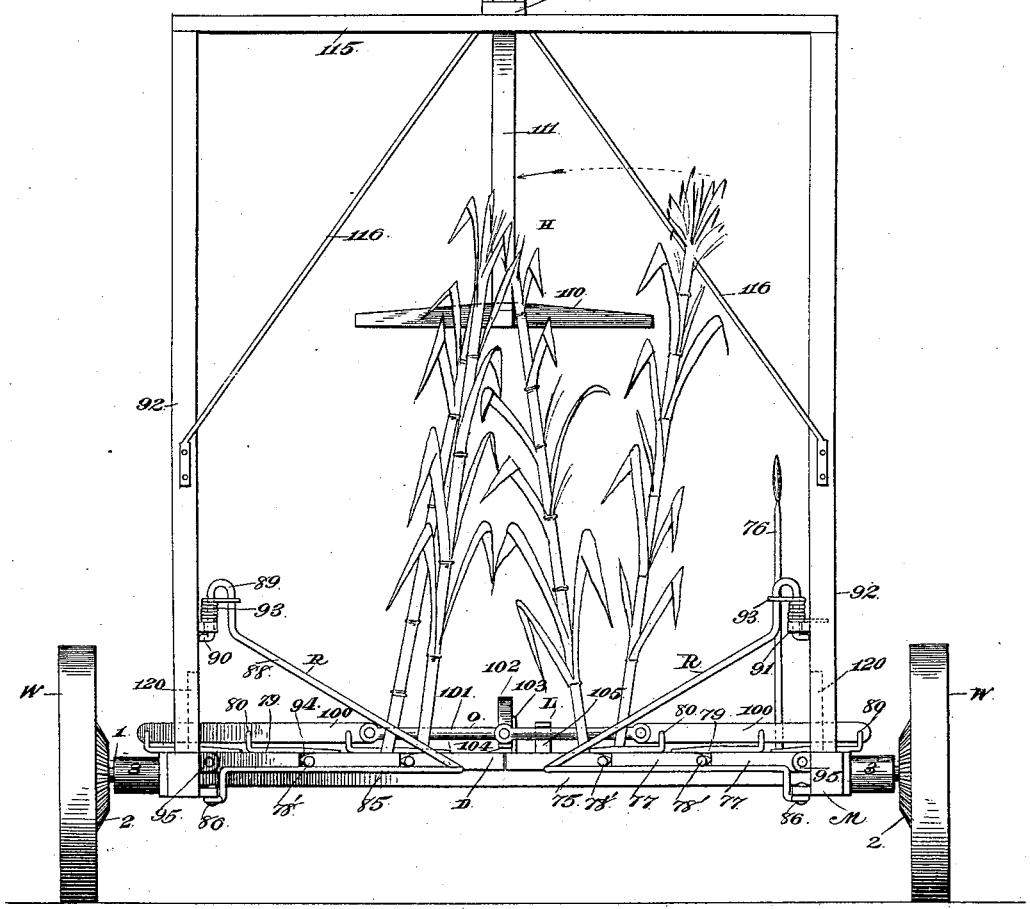
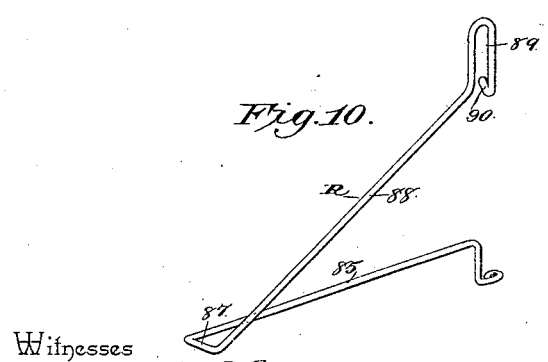
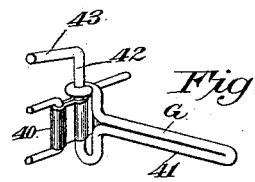
Witnesses
Inventor
Henry C. Peoples
Alonzo E. Peoples
By their Attorneys,

UNITED STATES PATENT OFFICE.

HENRY C. PEOPLES AND ALONZO E. PEOPLES, OF ESKRIDGE, KANSAS.

CORN-HARVESTER.

SPECIFICATION forming part of Letters Patent No. 482,065, dated September 6, 1892.

Application filed August 14, 1891. Serial No. 402,634. (No model.)

*To all whom it may concern:*

Be it known that we, HENRY C. PEOPLES and ALONZO E. PEOPLES, citizens of the United States, residing at Eskridge, in the county of Wabaunsee and State of Kansas, have invented a new and useful Corn-Harvester, of which the following is a specification.

This invention relates to harvesters of that class adapted for harvesting corn and similar stalks; and the object of the same is to produce certain improvements in harvesters of this nature.

To this end the invention consists in the construction hereinafter more fully described and claimed, and as illustrated on the six sheets of drawings, wherein—

Figure 1:
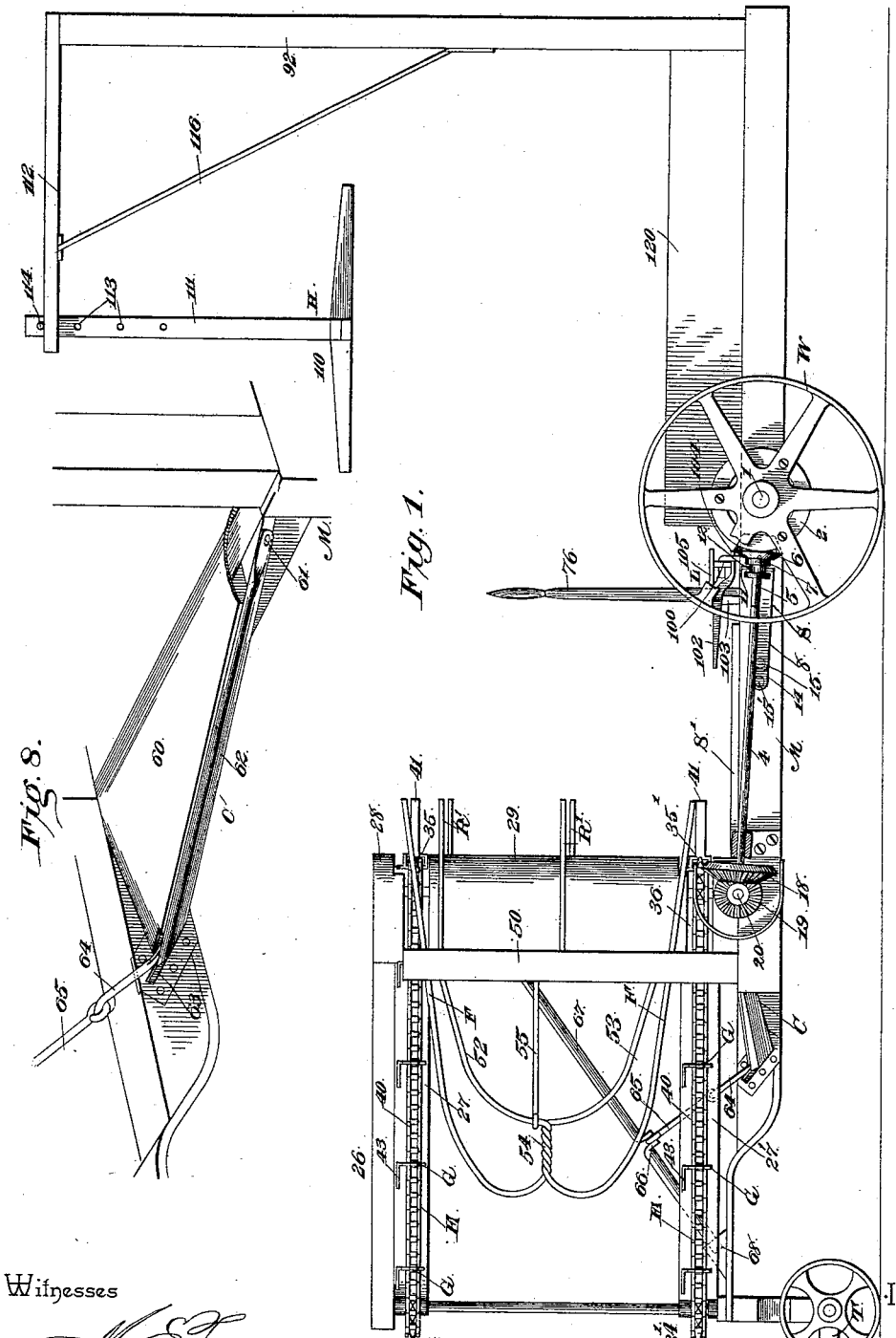
Figure 2:
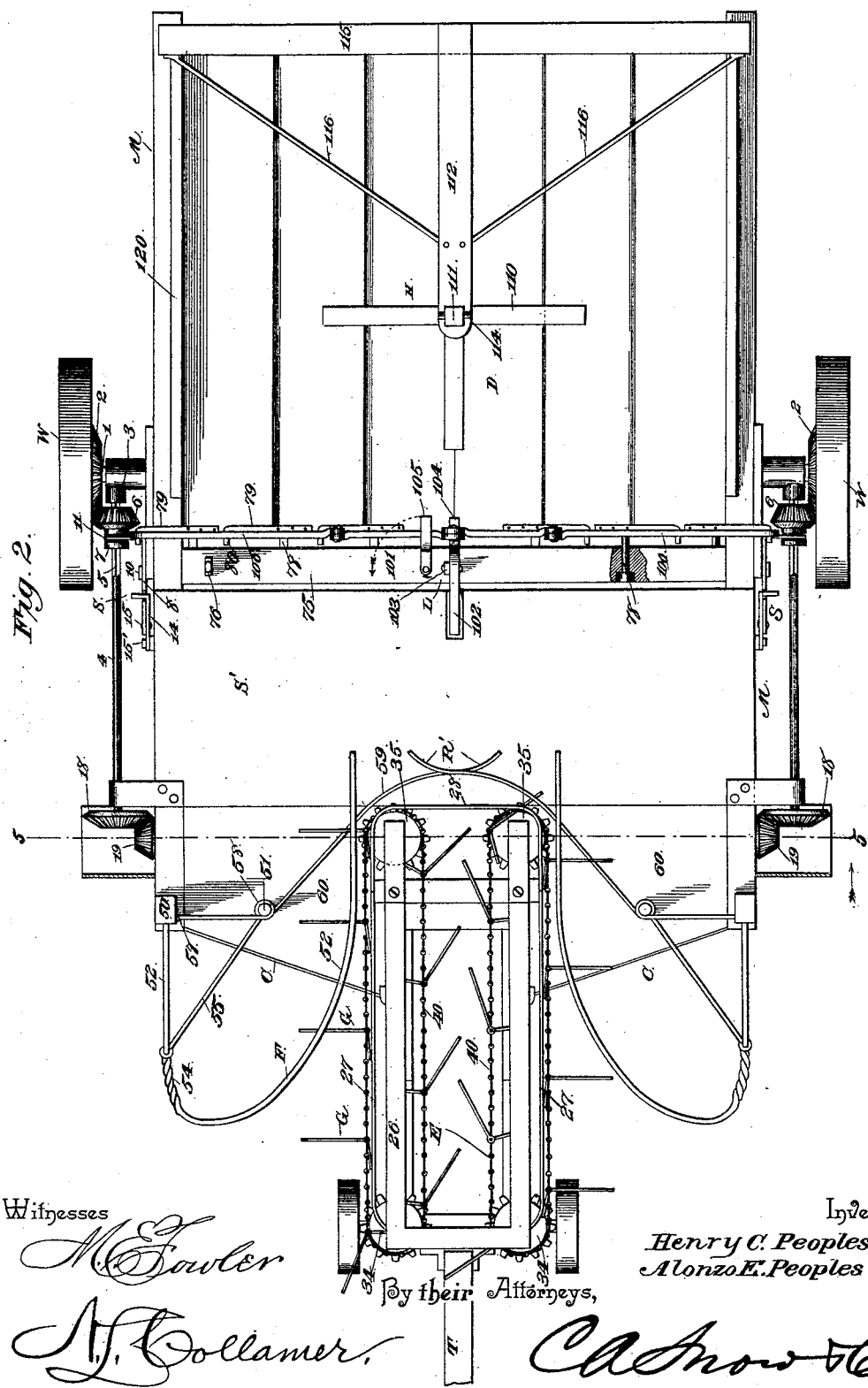
Figure 3:
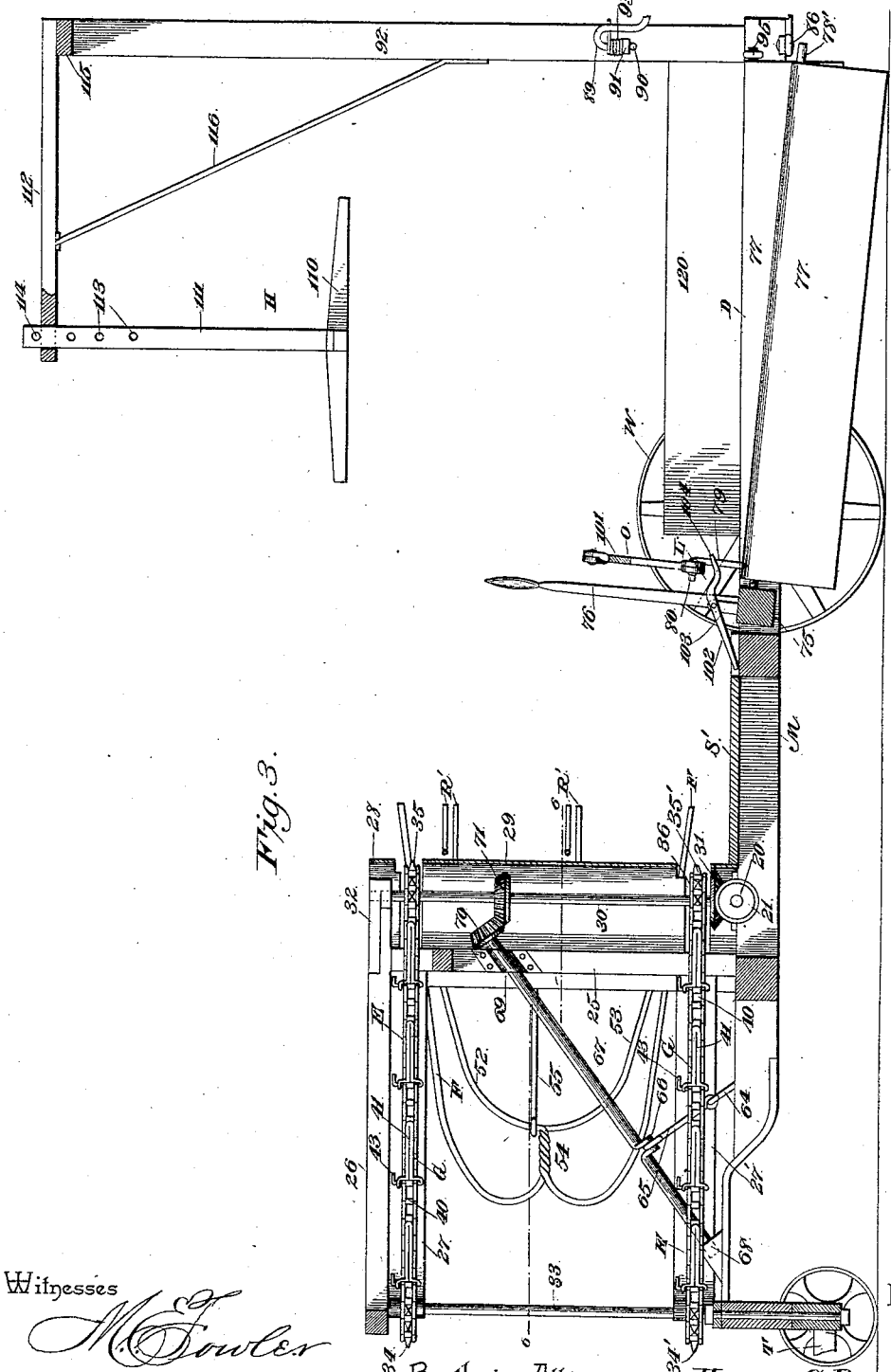
Figure 4:
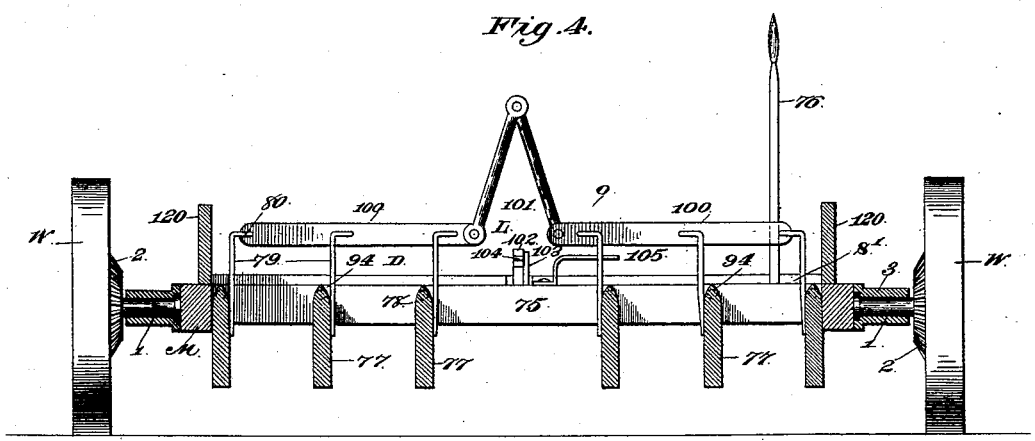
Figure 5:
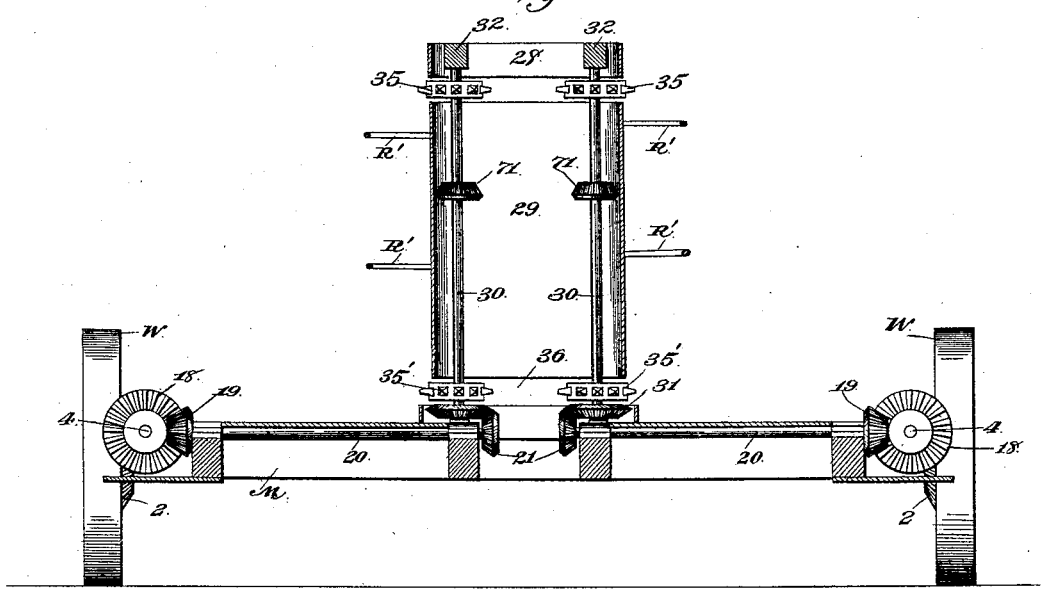

Figure 1 is a left-side elevation of this machine. Fig. 2 is a plan view with the table raised and the slats horizontal. Fig. 3 is a central longitudinal section showing the machine as dumped. Fig. 4 is a transverse section taken through the two supporting-wheels and showing the slats as dumped. Fig. 5 is a transverse section on the line 5 5 of Fig. 2. Fig. 6 is a horizontal section taken above the lower carriers on the line 6 6 of Fig. 3 and illustrating nothing in rear of the sill, this view showing the operation of the grasping-fingers and of the retaining-springs. Fig. 7 is a rear elevation illustrating the manner in which the sheaf is formed. Fig. 8 is a perspective detail of the knife-operating mechanism. Fig. 9 is a perspective detail of the shifting mechanism connected with the hub of one of the main wheels. Fig. 10 is a perspective detail of one of the retaining-arms. Fig. 11 is a perspective detail of one of the grasping-fingers.

This machine comprises a main frame M, supported at about its longitudinal center by main wheels W and at its front end by a pivoted truck carrying the tongue or thills T, a cutting apparatus C at each of the front corners of the frame, guide-fingers F and retaining-springs R' outside said cutting apparatus, and rearwardly-moving endless carriers E, located inside the cutting apparatus and driven by connections with the main wheels, the connections being thrown into or out of gear by shifting mechanisms S, said endless carriers having grasping-fingers G, whereby the stalks that are cut are moved to the rear onto a sill S', mounted on the frame, and there held by said retaining-springs until the operator removes them.

At the rear end of the main frame is a dumping-table D, composed of a number of slats adapted to turn axially as well as to have their rear ends depressed. O is the operating mechanism for turning the slats. L is a latch for locking this mechanism, and R are retaining-arms for holding the sheaf on the table and for supporting the rear ends of the slats. Above said table is a head-guide H, against which the heads of the stalks are placed by the operator in the act of making the sheaf.

Referring to the said drawings, the main wheels W are mounted on stub-axles 1, projecting outwardly from the sides of the main frame, and on the inner face of each wheel W is a toothed ring 2.

3 are boxes secured to the stub-axles 1 and in which are journaled the rear ends of longitudinal shafts 4, each of which is squared, as at 5, near its rear end. (See Fig. 9.) On this squared portion slides the squared hub of a gear 6, which has secured thereto a grooved collar 7.

8 is a plate having a slot 9 in its body sliding over a pin 10, extending outwardly from the frame, the rear end 11 of this plate being turned outwardly and having a notch 12, loosely engaging the groove in the collar 7. The front end of the plate is pivoted, as at 15, to a lever 14, whose lower end is pivotally connected, as at 15', to the frame and whose upper end has an outwardly-projecting finger 16, adapted to engage a notch 17 in the upper edge of the plate 8 when the lever is thrown to the rear, as seen in full lines in this figure. At this time the gear 6 will engage the toothed ring 2 and the shaft 4 will be rotated by the movement of the main wheel W; but when the lever 14 is raised, as seen in dotted lines, the gear will be drawn forwardly on the square portion 5 of the shaft and will be disengaged from said toothed ring. Thus it will be seen that the operator standing on the sill S', which extends across the frame forward of the shifting mechanism S, just described, can manipulate either or both of the levers 14 to throw one or both of the longitudinal shafts 4 into or out of engagement with the main wheels, all for a purpose to appear hereinafter. The front ends of the shafts 4 carry gear-wheels 18, which intermesh with gears 19 on transverse shafts 20, the latter being mounted in suitable bearings on the frame and having gears 21 at their inner ends by which the endless carriers, grasping-fingers, and cutters are operated.

25 25 are upright rods or bars rising from the frame, and 26 is an open table projecting forwardly from the upper ends of these upright bars and having depending plates 27 27 along its edges. The rear end of this table is open; but a curved yoke 28 extends around the same, and beneath this yoke a curved guard-plate 29 connects the upright bars 25.

30 are upright shafts stepped in the frame and having gears 31 near their lower ends intermeshing with those numbered 21 on the inner ends of the transverse shafts 20, and the upper ends of these upright shafts are journaled in bearings 32, connected with the upright bars 25, whereby said upright shafts are caused to stand within the yoke and guard-plate and to rotate in opposite directions.

33 are upright idle-shafts stepped in bearings at the extreme front end of the frame and with their upper ends journaled in the front corners of the table 26, and over sprocket-wheels 34 on these idle-shafts and 35 on the upright shafts pass endless carriers E. These sprocket-wheels and endless carriers are duplicated, as at 34', 35', and E', the guard-plate 29 being provided with a slot 36 near its lower end, through which the lower carriers pass, and this guard-plate being connected with the idle-shafts by plates 27', serving the same purpose as those numbered 27 at the edges of the table 26. The said endless carriers and their grasping-fingers G are of the following construction: 40 is a sprocket-chain adapted to engage the teeth of the sprocket-wheels 34 and 35 in the well-known manner, the outer sides of these chains passing to the rear along and over the outer faces of the plates 27. Pivotally mounted in occasional links of each chain are grasping-fingers G, whose outer ends 41 are adapted to project outwardly at right angles from the body of the chain, as seen in Fig. 6, when in their operative positions. The pivot-pin 42 of each finger, which is journaled in the link of the chain, extends upwardly and is bent rearwardly, as at 43, so that it shall stand at right angles to the outer end 41 of the finger, and hence as any finger moves to the rear this end trails along against the outer face of the plate 27 and causes the outer end 41 to stand in operative position. In such position it grasps the stalks which are borne against it by the fingers F, described below, and carries them to the rear against and over the cutting apparatus C and onto the sill S'; but as soon as each grasping-finger commences to move forwardly on the inner side of its chain it is permitted to turn to the rear if it be struck by any projecting stalk that may stand in its path.

These devices are duplicated at the sides of the machine and also at the upper and lower ends of the upright bars 25, and hence there are four rearwardly-moving endless carriers which operate on the stalks near their upper and their lower ends and which serve as packer-arms in a manner which will appear below. At the front corners of the main frame M are uprights 50, and just inside of each is a supplemental upright 51. The fingers F, which guide the stalks to the cutting apparatus C and bear them between the grasping-fingers G, are carried by these uprights and are constructed as follows: 52 53 are stout spring-wires which are connected at a point of crossing near their centers by a twist 54, and are then turned on edge and bent into approximate U shape, as seen in Fig. 2. One end of this U is connected with each upright 50, the center or bend of the U projecting forwardly and the other end thereof extending over the cutting apparatus and to the rear of and parallel with the endless carriers, and the twist 54 is preferably connected by one or more braces 55 with the supplemental upright 51. The retaining-springs R' are seated at their outer ends 57 in the upright 50, make a spring-coil 58 around the supplemental upright 51, and have their inner ends 59 extended inwardly in rear of the guard-plate 29, where they lap those at the other side of the frame. We have shown two of these retaining-springs mounted on each pair of uprights; but it will be obvious that more can be used, if desired. With this construction the stalks which strike the fingers are borne by the spring force thereof in an inward direction against the endless carriers and the grasping-fingers move them to the rear (the knives meanwhile cutting them off) until they are carried into and packed within the retaining-springs, between the rear ends of the fingers, against the rear side of the guard-plate, and upon the sill, the retaining-springs yielding to permit this, as seen in Fig. 6. The sill S' has at each side of the guard-plate 29 a forward extension 60. The front edge is inclined to the rear and pivoted to the frame at a point 61. Near the outer corner of each extension is a knife 62, whose body stands along the front edge of the extension and whose inner end moves in an oblique slot 63 in the frame. From this inner end an arm 64 projects upwardly and is linked to a pitman-rod 65, whose upper end is mounted on a crank 66 in the body of a shaft 67. The latter is stepped at its lower front end, as at 68, in a bearing on the frame, whence it extends upwardly and rearwardly, has a bearing 69 on the inner face of one of the upright bars 25, and has a bevel-gear 70 at its rear end, which meshes with another 71 on the upright shaft 30. By this construction power is communicated from the upright shafts to cause a reciprocation in an inclined manner of the inner ends of the knives around their pivoted outer ends; but this motion of course ceases when the shifting mechanism S at that side of the machine is operated to stop the rotation of the upright shaft. We have discovered that a cutting apparatus of this character is preferable to one having a stationary oblique knife, for the reason, among others, that with the latter construction a draw-cut is necessary; but with the construction herein described the stalks are chopped off at the proper points and are not carried outwardly by the knife-edge, which would bear them against the fingers and away from the endless carriers and their grasping-fingers. For this reason the cutting apparatus described is preferable in connection with the other features which we use.

The dumping-table D is of the following construction: 75 is a transverse bar journaled at its ends in the side bars of the frame, and and 76 is a handle rising from this bar, whereby it may be oscillated on its journals or pivots. 77 are slats having headed pins 78 projecting from their front upper corners and which are journaled in the bar 75. Across the front ends of the slats are secured straps 79, which project beyond the edges of the slats and have forwardly-bent ends 80, and these ends are actuated by the operating mechanism O, described below, when it is desired to turn the slats on their pivots. The rear upper corners of the slats are provided with pivot-pins 78', adapted to be engaged and supported by the retaining-arms R when the table D is to be maintained in a horizontal position. These arms are best illustrated in Fig. 10, and each comprises a lower member 85, pivoted at its outer end 86 to the frame M, its inner end being bent slightly to the rear, as at 87, and an upper member 88, extending from said rearward bend upwardly and outwardly at an acute angle to the line of the lower member. The upper end of the upper member is bent into inverted-U shape, as seen at 89, and its extremity 90 is bent forward. An eye or staple 91 loosely embraces the outer side of the U, which eye is mounted in a rear upright 92, rising from the corner of the frame, and the forwardly-bent extremity 90 prevents the arm from swinging forward beyond a transverse line through the uprights. Springs 93 bear these arms normally forward, and their lower members 85 will then pass under the pins 78' at the rear ends of the slats, if such ends have been previously elevated by oscillating the transverse bar 75 by its handle 76. We have shown six slats 75, arranged in two banks, although there may be more or less slats, and each is preferably sharpened at its upper edge, as at 94, the rear pins 78' of the two outer slats being preferably pivotally mounted in eyes 95 on the frame, as seen in Fig. 7.

The said operating mechanism O consists of two horizontal straps 100, pivotally mounted on and connecting the forwardly-bent ends 80 of the straps 79, and the inner ends of these horizontal straps are connected by a toggle-lever 101. When the center of this lever is raised, the slats are turned on their pivots so as to cause their sharpened edges 94 to stand uppermost.

The latch mechanism L for locking and for operating the said toggle-lever comprises a foot-lever 102, pivoted near its center to an upright 103, rising from the transverse bar 75, the rear end 104 of this lever passing beneath the center of the toggle, so that when the front end of the lever is depressed by the foot of the operator the knuckle or joint of the toggle-lever will be started upward and will thereafter rise by itself. 105 is a catch or button, also pivoted on the transverse bar 75 in such position that its free end can be turned over the knuckle of the toggle-lever when the latter is depressed, and by this means said lever will be locked against rising, and hence the slats will be prevented from turning on edge. All this latch mechanism operates independently of the dumping of the table and is located at a point conveniently accessible to the operator's foot.

The head-guide H consists of a Greek or other shaped cross 110, standing in a horizontal plane about above the center of the dumping-table D, and rising from the center of this cross is an upright bar 111, which passes loosely through a hole in the front end of an arm 112 and is provided with a number of transverse perforations 113, through one of which is removably inserted a pin 114, whereby the cross may be held at any desired height above the table. The said arm 112 projects forwardly from the center of a cross-bar 115, which connects the upper ends of the rear uprights 92, and the arm is preferably steadied by inclined braces 116, as shown.

The sheaf is formed and dumped from the machine in the following manner: The table being raised and its slats standing horizontal, as seen in Fig. 2, the operator places the stalks in an upright position on said table, their lower ends standing inside side walls 120 on the frame, by which they are prevented from lateral displacement, and resting against the upper members of the retaining-arms, by which they are prevented from slipping off the rear end of the table. The header cross or guide, which has been adjusted to the proper height, serves as a stop against which the stalks rest near their upper ends, as seen in Fig. 7, the operator building the sheaf by hand in manner which will be clear. After it is finished it may or may not be tied, as preferred; but if it is thus bundled it must be very loosely tied and near the upper ends of the stalks. If the sheaf be not very large and heavy, it can be discharged from the table by simply pushing it bodily to the rear, which motion will turn the retaining-arms R outwardly around their pivots, so as to permit its passage and so as to allow the table to dump when the rear ends of the slats fall and thereby assist the discharge, and in this case the bundle can be very tightly tied; but it will be necessary to raise the head-guide H from out of the bundle before attempting to discharge it. On the other hand, if the bundle is large and occupies perhaps almost the entire surface of the table it will be necessary to discharge the bundle to first manipulate the operating mechanism O, so as to turn the slats on edge, when all the stalks of the bundle will drop between the slats onto the ground, and the further forward movement of the machine will draw the slats out of the bundle, the latter striking and automatically throwing the retaining-arms R to the rear to permit its discharge. In this case the dropping of the stalks disconnects their heads from the guide H, and it will be obvious that the bundle cannot be tight nor tied near its lower end. In either case before the retaining-arms R slip off of the bundle and fly back into position the operator must manipulate the handle 76 to raise the rear ends of the slats in order that the lower members 85 of the retaining-arms may engage the pins 78' at said ends and hold the slats elevated.

The front end of the frame is supported by any approved pattern of truck T, and, a horse or a team being hitched to the thills or the tongue projecting from this truck, the machine is drawn through the corn-field. If two rows of stalks are to be cut, the horse travels between the rows, and they are respectively engaged by the two cutters, and at this time the shifting mechanisms S must be so set that the devices at both sides of the machine will be in operation, whereas if only one row is to be cut obviously only one side of the machine need be in operation, and the draft will be correspondingly lighter. The stalks are engaged by the grasping-fingers G and endless carriers E and borne thereby to the rear in the passage-ways formed between the edges of the table 26 and the spring-fingers F, the knives cutting the stalks near the ground and their lower ends sliding rearwardly upon the sill extensions 60. The endless carriers and grasping-fingers move the stalks clear around in rear of the guard-plate 29 and beneath the retaining-springs R', thus serving as packer-arms, and the accumulated stalks are from time to time removed from these retaining-springs by the operator and added to the growing sheaf, whose formation and discharge have been already described.

The various details of construction which conduce to the mechanical perfection of this machine need not be elaborately described and many changes in the above details may be made without departing from the spirit of our invention.

Parts of the mechanism may be used independently of other parts or may be combined with entirely different elements to produce the same results; but we prefer the constructions and combinations above set forth, reserving the right to make such minor alterations therein as are included within the scope of the invention.

What is claimed as new is—

1. In a corn-harvester, the combination, with a discharge-table consisting of a series of slats axially pivoted in a pivoted transverse sill at the forward end of the table and pivoted spring-actuated retaining-arms at the rear end thereof, of means for maintaining the slats in a horizontal position within their supports, substantially as specified.

2. In a corn-harvester, the combination, with the main frame and the cutting apparatus, of a table comprising slats, each pivoted in an oscillating bar extending across the frame, means for rocking said bar, spring-actuated retaining-arms at the delivery-edge of the table, adapted to support it when raised, and means for turning the slats on their pivots to discharge the stalks, all substantially as described.

3. In a corn-harvester, the combination, with the main frame and the cutting apparatus thereon, of a dumping-table comprising a series of axially-pivoted slats mounted at their front ends in a transverse bar journaled in the frame, arms extending from the front corners of the slats, a metal strap pivotally connected to the upper ends of the arms, a latch on said bar for locking the slats in their flat positions, and retaining-arms at the rear end of the table for supporting the slats, substantially as specified.

4. In a corn-harvester, the combination, with the main frame, a transverse bar journaled in said frame, a handle rising from said bar, a number of slats, each having one thin edge, and pins projecting from the ends of the slats near their thin edges, those at the front ends being pivoted in said bar, of retaining-arms pivoted to the frame and having lower horizontal members adapted to support the pins at the rear ends of the slats when the arms are swung inwardly and the means for turning said slats on their pivots, substantially as described.

5. In a corn-harvester, the combination, with the frame having a transverse bar, a number of slats, each having one thin edge, pins projecting from the ends of the slats near their thin edges, those at the front being journaled in said bar, and arms adapted to support the rear pins, of straps secured across the slats and each having a forwardly-bent end, two horizontal straps, each pivotally mounted on the forwardly-bent ends at its side of the frame, a toggle-lever connecting the inner ends of said horizontal straps, and a latch for said lever, substantially as described.

6. In a corn-harvester, the combination, with the main frame, two banks of slats therein, each slat being pivotally supported near one edge, a horizontal strap connected to each bank, and a toggle-lever connecting said straps, of a button on the frame adapted to engage the knuckle of said lever, an upright adjacent said knuckle, and a tripping-lever pivoted to said standard and passing beneath the knuckle, as and for the purpose set forth.

7. In a corn-harvester, the combination, with the main frame and a dumping-table therein having pins projecting from its delivery-edge, of uprights on the frame, eyes therein, retaining-arms whose upper ends are pivoted in said eyes and thence extend forwardly and whose bodies are adapted to engage said pins, and springs throwing said arms normally forward, so that their forwardly-bent ends will strike said uprights, as and for the purpose set forth.

8. In a corn-harvester, the combination, with a main frame and a dumping-table therein having pins projecting from its delivery-edge, of uprights on the frame, eyes therein, retaining-arms, each comprising a horizontal lower member pivoted at its outer end to the frame, its inner end extending slightly to the rear, an upwardly-inclined upper member leading therefrom into an inverted U at its upper end and thence forwardly, the lower member being adapted to engage said pins, an eye in the upright in which said U is pivoted, and means for throwing the arm normally forward, as and for the purpose set forth.

9. In a corn-harvester, the combination, with the framework having a stub-shaft provided with a box and the main wheel mounted on said shaft and having a toothed ring, of a shaft one end of which is journaled in said box and the body of which adjacent this end is squared, a gear having a square hub sliding on said shaft and adapted to engage said ring, a grooved collar connected to said gear, a lever pivoted to said frame and having a finger, and a plate pivoted to the lever, having a slot in its body sliding over a stud on the frame having an outturned end provided with a notch engaging the groove in the collar and having a notch in which said finger is adapted to rest, as and for the purpose set forth.

10. In a corn-harvester, the combination, with the frame, an upright thereon, and the cutting apparatus, of a guiding-finger comprising two stout spring-wires crossed and twisted together at their centers, turned on edge, and bent into U shape in plan, one end of the U being secured in said upright and the other end projecting to the rear above said cutting apparatus, substantially as described.

11. In a corn-harvester, the combination, with the frame mounted on wheels and a sill on said frame having a forward extension, of a knife pivoted near one edge of the extension with its other end moving in a slot, an upright shaft driven by connections with one of said wheels, grasping-fingers operated by the rotation of said shaft, an inclined crank-shaft terminating at its upper end in a gear meshing with a gear on the upright shaft, and a pitman-rod connected at one end with the crank and at the other end with the movable end of the knife, as and for the purpose set forth.

12. In a corn-harvester, the combination, with stub-axles having boxes on their front sides, main wheels on said axles, and toothed rings on said wheels, of shafts journaled in said boxes and leading forwardly, the cutting apparatus connected oppositely with and operated by said shafts, gears and collars on the shafts, and shifting mechanism, substantially as described, for moving each gear by its collar into or out of mesh with the toothed ring on the main wheel, as and for the purpose hereinbefore set forth.

In testimony that we claim the foregoing as our own we have hereto affixed our signatures in presence of two witnesses.

HENRY C. PEOPLES.
ALONZO E. PEOPLES.

Witnesses:
W. H. MELROSE,
J. M. LEE.